United States Patent [19]

Gharavi

[11] Patent Number: 4,821,119
[45] Date of Patent: Apr. 11, 1989

[54] METHOD AND APPARATUS FOR LOW BIT-RATE INTERFRAME VIDEO CODING

[75] Inventor: Hamid Gharavi, Red Bank Borough, N.J.

[73] Assignee: Bell Communications Research, Inc., Livingston, N.J.

[21] Appl. No.: 190,251

[22] Filed: May 4, 1988

[51] Int. Cl.[4] .................... H04N 7/133; H04N 7/137
[52] U.S. Cl. .................... 358/136; 358/133; 375/122; 375/27
[58] Field of Search .................... 358/133, 135, 136; 375/27, 122

[56] References Cited

U.S. PATENT DOCUMENTS

| | | | |
|---|---|---|---|
| 4,691,329 | 9/1987 | Juri | 375/122 |
| 4,704,628 | 11/1987 | Chen | 358/136 |
| 4,707,738 | 11/1987 | Ferre | 358/135 |

OTHER PUBLICATIONS

"Scene Adaptive Coder", *IEEE Trans. Commun.*, vol. COM-32, W. Chen et al., Mar. 1984, pp. 225-232.
"Motion-Compensated Interframe Coding for Video Conferencing," *Proc. NTC* 81, T. Koga et al., G5.3.1-G5.3.5.
"Progress of CCITT Standardization on n×384 kbit/s Video Codec," *Globcom-87*, S. Okubo et al.

*Primary Examiner*—Howard W. Britton
*Attorney, Agent, or Firm*—James W. Falk; Stephen M. Gurey

[57] ABSTRACT

An improved low bit-rate interframe video encoder is disclosed of the type known as a hybrid coder. A hybrid coder achieves image compression by using a two-dimensional signal transformation on blocks of differential pel data in the forward loop of a DPCM coder. The transform coefficients of each block are then quantized and entropy coded for transmission. Coding efficiency is in part determined by the size of the transform block. Larger blocks are more bit efficient because of the lower quantity of overhead data required, but require a complex transformer hardware implementation. In addition, larger blocks produce annoying block distortion. The disclosed coder has the advantages of both large and small block size division of the video image. In the disclosed coder, after differential combination (307) with a corresponding block from the previous frame, each m×m block of pel data is sub-divided (309) into smaller n×n (n<m) blocks of data which are individually transformed by a two-dimensional discrete cosine transformer (311). After the coefficients of each sub-block are quantized (312), the main block is reconstructed (314). An entropy encoder (315) scans the sub-blocks and codes the resultant string of scanned coefficients in such a way that the inter-sub-block correlation is efficiently exploited.

17 Claims, 7 Drawing Sheets

FIG. 4

$$\begin{bmatrix} q_{11} & q_{12} & q_{13} & q_{14} \\ q_{21} & q_{22} & q_{23} & q_{24} \\ q_{31} & q_{32} & q_{33} & q_{34} \\ q_{41} & q_{42} & q_{43} & q_{44} \end{bmatrix}$$

| $c^{11}_{11}$ | $c^{11}_{12}$ | $c^{11}_{13}$ | $c^{11}_{14}$ | $c^{12}_{11}$ | $c^{12}_{12}$ | $c^{12}_{13}$ | $c^{12}_{14}$ | $c^{13}_{11}$ | $c^{13}_{12}$ | $c^{13}_{13}$ | $c^{13}_{14}$ | $c^{14}_{11}$ | $c^{14}_{12}$ | $c^{14}_{13}$ | $c^{14}_{14}$ |
|---|---|---|---|---|---|---|---|---|---|---|---|---|---|---|---|
| $c^{11}_{21}$ | $c^{11}_{22}$ | $c^{11}_{23}$ | $c^{11}_{24}$ | $c^{12}_{21}$ | $c^{12}_{22}$ | $c^{12}_{23}$ | $c^{12}_{24}$ | $c^{13}_{21}$ | $c^{13}_{22}$ | $c^{13}_{23}$ | $c^{13}_{24}$ | $c^{14}_{21}$ | $c^{14}_{22}$ | $c^{14}_{23}$ | $c^{14}_{24}$ |
| $c^{11}_{31}$ | $c^{11}_{32}$ | $c^{11}_{33}$ | $c^{11}_{34}$ | $c^{12}_{31}$ | $c^{12}_{32}$ | $c^{12}_{33}$ | $c^{12}_{34}$ | $c^{13}_{31}$ | $c^{13}_{32}$ | $c^{13}_{33}$ | $c^{13}_{34}$ | $c^{14}_{31}$ | $c^{14}_{32}$ | $c^{14}_{33}$ | $c^{14}_{34}$ |
| $c^{11}_{41}$ | $c^{11}_{42}$ | $c^{11}_{43}$ | $c^{11}_{44}$ | $c^{12}_{41}$ | $c^{12}_{42}$ | $c^{12}_{43}$ | $c^{12}_{44}$ | $c^{13}_{41}$ | $c^{13}_{42}$ | $c^{13}_{43}$ | $c^{13}_{44}$ | $c^{14}_{41}$ | $c^{14}_{42}$ | $c^{14}_{43}$ | $c^{14}_{44}$ |
| $c^{21}_{11}$ | $c^{21}_{12}$ | $c^{21}_{13}$ | $c^{21}_{14}$ | $c^{22}_{11}$ | $c^{22}_{12}$ | $c^{22}_{13}$ | $c^{22}_{14}$ | $c^{23}_{11}$ | $c^{23}_{12}$ | $c^{23}_{13}$ | $c^{23}_{14}$ | $c^{24}_{11}$ | $c^{24}_{12}$ | $c^{24}_{13}$ | $c^{24}_{14}$ |
| $c^{21}_{21}$ | $c^{21}_{22}$ | $c^{21}_{23}$ | $c^{21}_{24}$ | $c^{22}_{21}$ | $c^{22}_{22}$ | $c^{22}_{23}$ | $c^{22}_{24}$ | $c^{23}_{21}$ | $c^{23}_{22}$ | $c^{23}_{23}$ | $c^{23}_{24}$ | $c^{24}_{21}$ | $c^{24}_{22}$ | $c^{24}_{23}$ | $c^{24}_{24}$ |
| $c^{21}_{31}$ | $c^{21}_{32}$ | $c^{21}_{33}$ | $c^{21}_{34}$ | $c^{22}_{31}$ | $c^{22}_{32}$ | $c^{22}_{33}$ | $c^{22}_{34}$ | $c^{23}_{31}$ | $c^{23}_{32}$ | $c^{23}_{33}$ | $c^{23}_{34}$ | $c^{24}_{31}$ | $c^{24}_{32}$ | $c^{24}_{33}$ | $c^{24}_{34}$ |
| $c^{21}_{41}$ | $c^{21}_{42}$ | $c^{21}_{43}$ | $c^{21}_{44}$ | $c^{22}_{41}$ | $c^{22}_{42}$ | $c^{22}_{43}$ | $c^{22}_{44}$ | $c^{23}_{41}$ | $c^{23}_{42}$ | $c^{23}_{43}$ | $c^{23}_{44}$ | $c^{24}_{41}$ | $c^{24}_{42}$ | $c^{24}_{43}$ | $c^{24}_{44}$ |
| $c^{31}_{11}$ | $c^{31}_{12}$ | $c^{31}_{13}$ | $c^{31}_{14}$ | $c^{32}_{11}$ | $c^{32}_{12}$ | $c^{32}_{13}$ | $c^{32}_{14}$ | $c^{33}_{11}$ | $c^{33}_{12}$ | $c^{33}_{13}$ | $c^{33}_{14}$ | $c^{34}_{11}$ | $c^{34}_{12}$ | $c^{34}_{13}$ | $c^{34}_{14}$ |
| $c^{31}_{21}$ | $c^{31}_{22}$ | $c^{31}_{23}$ | $c^{31}_{24}$ | $c^{32}_{21}$ | $c^{32}_{22}$ | $c^{32}_{23}$ | $c^{32}_{24}$ | $c^{33}_{21}$ | $c^{33}_{22}$ | $c^{33}_{23}$ | $c^{33}_{24}$ | $c^{34}_{21}$ | $c^{34}_{22}$ | $c^{34}_{23}$ | $c^{34}_{24}$ |
| $c^{31}_{31}$ | $c^{31}_{32}$ | $c^{31}_{33}$ | $c^{31}_{34}$ | $c^{32}_{31}$ | $c^{32}_{32}$ | $c^{32}_{33}$ | $c^{32}_{34}$ | $c^{33}_{31}$ | $c^{33}_{32}$ | $c^{33}_{33}$ | $c^{33}_{34}$ | $c^{34}_{31}$ | $c^{34}_{32}$ | $c^{34}_{33}$ | $c^{34}_{34}$ |
| $c^{31}_{41}$ | $c^{31}_{42}$ | $c^{31}_{43}$ | $c^{31}_{44}$ | $c^{32}_{41}$ | $c^{32}_{42}$ | $c^{32}_{43}$ | $c^{32}_{44}$ | $c^{33}_{41}$ | $c^{33}_{42}$ | $c^{33}_{43}$ | $c^{33}_{44}$ | $c^{34}_{41}$ | $c^{34}_{42}$ | $c^{34}_{43}$ | $c^{34}_{44}$ |
| $c^{41}_{11}$ | $c^{41}_{12}$ | $c^{41}_{13}$ | $c^{41}_{14}$ | $c^{42}_{11}$ | $c^{42}_{12}$ | $c^{42}_{13}$ | $c^{42}_{14}$ | $c^{43}_{11}$ | $c^{43}_{12}$ | $c^{43}_{13}$ | $c^{43}_{14}$ | $c^{44}_{11}$ | $c^{44}_{12}$ | $c^{44}_{13}$ | $c^{44}_{14}$ |
| $c^{41}_{21}$ | $c^{41}_{22}$ | $c^{41}_{23}$ | $c^{41}_{24}$ | $c^{42}_{21}$ | $c^{42}_{22}$ | $c^{42}_{23}$ | $c^{42}_{24}$ | $c^{43}_{21}$ | $c^{43}_{22}$ | $c^{43}_{23}$ | $c^{43}_{24}$ | $c^{44}_{21}$ | $c^{44}_{22}$ | $c^{44}_{23}$ | $c^{44}_{24}$ |
| $c^{41}_{31}$ | $c^{41}_{32}$ | $c^{41}_{33}$ | $c^{41}_{34}$ | $c^{42}_{31}$ | $c^{42}_{32}$ | $c^{42}_{33}$ | $c^{42}_{34}$ | $c^{43}_{31}$ | $c^{43}_{32}$ | $c^{43}_{33}$ | $c^{43}_{34}$ | $c^{44}_{31}$ | $c^{44}_{32}$ | $c^{44}_{33}$ | $c^{44}_{34}$ |
| $c^{41}_{41}$ | $c^{41}_{42}$ | $c^{41}_{43}$ | $c^{41}_{44}$ | $c^{42}_{41}$ | $c^{42}_{42}$ | $c^{42}_{43}$ | $c^{42}_{44}$ | $c^{43}_{41}$ | $c^{43}_{42}$ | $c^{43}_{43}$ | $c^{43}_{44}$ | $c^{44}_{41}$ | $c^{44}_{42}$ | $c^{44}_{43}$ | $c^{44}_{44}$ |

| $c^{11}_{11}$ | $c^{11}_{12}$ | $c^{11}_{13}$ | $c^{11}_{14}$ | $c^{12}_{11}$ | $c^{12}_{12}$ | $c^{12}_{13}$ | $c^{12}_{14}$ | $c^{13}_{11}$ | $c^{13}_{12}$ | $c^{13}_{13}$ | $c^{13}_{14}$ | $c^{14}_{11}$ | $c^{14}_{12}$ | $c^{14}_{13}$ | $c^{14}_{14}$ |
|---|---|---|---|---|---|---|---|---|---|---|---|---|---|---|---|
| $c^{11}_{21}$ | $c^{11}_{22}$ | $c^{11}_{23}$ | $c^{11}_{24}$ | $c^{12}_{21}$ | $c^{12}_{22}$ | $c^{12}_{23}$ | $c^{12}_{24}$ | $c^{13}_{21}$ | $c^{13}_{22}$ | $c^{13}_{23}$ | $c^{13}_{24}$ | $c^{14}_{21}$ | $c^{14}_{22}$ | $c^{14}_{23}$ | $c^{14}_{24}$ |
| $c^{11}_{31}$ | $c^{11}_{32}$ | $c^{11}_{33}$ | $c^{11}_{34}$ | $c^{12}_{31}$ | $c^{12}_{32}$ | $c^{12}_{33}$ | $c^{12}_{34}$ | $c^{13}_{31}$ | $c^{13}_{32}$ | $c^{13}_{33}$ | $c^{13}_{34}$ | $c^{14}_{31}$ | $c^{14}_{32}$ | $c^{14}_{33}$ | $c^{14}_{34}$ |
| $c^{11}_{41}$ | $c^{11}_{42}$ | $c^{11}_{43}$ | $c^{11}_{44}$ | $c^{12}_{41}$ | $c^{12}_{42}$ | $c^{12}_{43}$ | $c^{12}_{44}$ | $c^{13}_{41}$ | $c^{13}_{42}$ | $c^{13}_{43}$ | $c^{13}_{44}$ | $c^{14}_{41}$ | $c^{14}_{42}$ | $c^{14}_{43}$ | $c^{14}_{44}$ |
| $c^{21}_{11}$ | $c^{21}_{12}$ | $c^{21}_{13}$ | $c^{21}_{14}$ | $c^{22}_{11}$ | $c^{22}_{12}$ | $c^{22}_{13}$ | $c^{22}_{14}$ | $c^{23}_{11}$ | $c^{23}_{12}$ | $c^{23}_{13}$ | $c^{23}_{14}$ | $c^{24}_{11}$ | $c^{24}_{12}$ | $c^{24}_{13}$ | $c^{24}_{14}$ |
| $c^{21}_{21}$ | $c^{21}_{22}$ | $c^{21}_{23}$ | $c^{21}_{24}$ | $c^{22}_{21}$ | $c^{22}_{22}$ | $c^{22}_{23}$ | $c^{22}_{24}$ | $c^{23}_{21}$ | $c^{23}_{22}$ | $c^{23}_{23}$ | $c^{23}_{24}$ | $c^{24}_{21}$ | $c^{24}_{22}$ | $c^{24}_{23}$ | $c^{24}_{24}$ |
| $c^{21}_{31}$ | $c^{21}_{32}$ | $c^{21}_{33}$ | $c^{21}_{34}$ | $c^{22}_{31}$ | $c^{22}_{32}$ | $c^{22}_{33}$ | $c^{22}_{34}$ | $c^{23}_{31}$ | $c^{23}_{32}$ | $c^{23}_{33}$ | $c^{23}_{34}$ | $c^{24}_{31}$ | $c^{24}_{32}$ | $c^{24}_{33}$ | $c^{24}_{34}$ |
| $c^{21}_{41}$ | $c^{21}_{42}$ | $c^{21}_{43}$ | $c^{21}_{44}$ | $c^{22}_{41}$ | $c^{22}_{42}$ | $c^{22}_{43}$ | $c^{22}_{44}$ | $c^{23}_{41}$ | $c^{23}_{42}$ | $c^{23}_{43}$ | $c^{23}_{44}$ | $c^{24}_{41}$ | $c^{24}_{42}$ | $c^{24}_{43}$ | $c^{24}_{44}$ |
| $c^{31}_{11}$ | $c^{31}_{12}$ | $c^{31}_{13}$ | $c^{31}_{14}$ | $c^{32}_{11}$ | $c^{32}_{12}$ | $c^{32}_{13}$ | $c^{32}_{14}$ | $c^{33}_{11}$ | $c^{33}_{12}$ | $c^{33}_{13}$ | $c^{33}_{14}$ | $c^{34}_{11}$ | $c^{34}_{12}$ | $c^{34}_{13}$ | $c^{34}_{14}$ |
| $c^{31}_{21}$ | $c^{31}_{22}$ | $c^{31}_{23}$ | $c^{31}_{24}$ | $c^{32}_{21}$ | $c^{32}_{22}$ | $c^{32}_{23}$ | $c^{32}_{24}$ | $c^{33}_{21}$ | $c^{33}_{22}$ | $c^{33}_{23}$ | $c^{33}_{24}$ | $c^{34}_{21}$ | $c^{34}_{22}$ | $c^{34}_{23}$ | $c^{34}_{24}$ |
| $c^{31}_{31}$ | $c^{31}_{32}$ | $c^{31}_{33}$ | $c^{31}_{34}$ | $c^{32}_{31}$ | $c^{32}_{32}$ | $c^{32}_{33}$ | $c^{32}_{34}$ | $c^{33}_{31}$ | $c^{33}_{32}$ | $c^{33}_{33}$ | $c^{33}_{34}$ | $c^{34}_{31}$ | $c^{34}_{32}$ | $c^{34}_{33}$ | $c^{34}_{34}$ |
| $c^{31}_{41}$ | $c^{31}_{42}$ | $c^{31}_{43}$ | $c^{31}_{44}$ | $c^{32}_{41}$ | $c^{32}_{42}$ | $c^{32}_{43}$ | $c^{32}_{44}$ | $c^{33}_{41}$ | $c^{33}_{42}$ | $c^{33}_{43}$ | $c^{33}_{44}$ | $c^{34}_{41}$ | $c^{34}_{42}$ | $c^{34}_{43}$ | $c^{34}_{44}$ |
| $c^{41}_{11}$ | $c^{41}_{12}$ | $c^{41}_{13}$ | $c^{41}_{14}$ | $c^{42}_{11}$ | $c^{42}_{12}$ | $c^{42}_{13}$ | $c^{42}_{14}$ | $c^{43}_{11}$ | $c^{43}_{12}$ | $c^{43}_{13}$ | $c^{43}_{14}$ | $c^{44}_{11}$ | $c^{44}_{12}$ | $c^{44}_{13}$ | $c^{44}_{14}$ |
| $c^{41}_{21}$ | $c^{41}_{22}$ | $c^{41}_{23}$ | $c^{41}_{24}$ | $c^{42}_{21}$ | $c^{42}_{22}$ | $c^{42}_{23}$ | $c^{42}_{24}$ | $c^{43}_{21}$ | $c^{43}_{22}$ | $c^{43}_{23}$ | $c^{43}_{24}$ | $c^{44}_{21}$ | $c^{44}_{22}$ | $c^{44}_{23}$ | $c^{44}_{24}$ |
| $c^{41}_{31}$ | $c^{41}_{32}$ | $c^{41}_{33}$ | $c^{41}_{34}$ | $c^{42}_{31}$ | $c^{42}_{32}$ | $c^{42}_{33}$ | $c^{42}_{34}$ | $c^{43}_{31}$ | $c^{43}_{32}$ | $c^{43}_{33}$ | $c^{43}_{34}$ | $c^{44}_{31}$ | $c^{44}_{32}$ | $c^{44}_{33}$ | $c^{44}_{34}$ |
| $c^{41}_{41}$ | $c^{41}_{42}$ | $c^{41}_{43}$ | $c^{41}_{44}$ | $c^{42}_{41}$ | $c^{42}_{42}$ | $c^{42}_{43}$ | $c^{42}_{44}$ | $c^{43}_{41}$ | $c^{43}_{42}$ | $c^{43}_{43}$ | $c^{43}_{44}$ | $c^{44}_{41}$ | $c^{44}_{42}$ | $c^{44}_{43}$ | $c^{44}_{44}$ |

FIG. 7C

METHOD AND APPARATUS FOR LOW BIT-RATE INTERFRAME VIDEO CODING

BACKGROUND OF THE INVENTION

This invention relates to coding techniques for the transmission of video information, and more particularly to coding methods for low bit-rate transmission of video information.

As Integrated Switched Digital Network (ISDN) service is implemented, it is predicted that a new service demand will be created for video telephony. As each subscriber will have the availability of 2B channel capacity, with each B channel being 64 Kb/s, transmission of motion video coupled with its associated audio over one or two of the B channels is desirable. In order to achieve such a low bit-rate video transmission, image compression techniques must be employed to achieve acceptable video quality. In recent years, due to the dramatic improvements in integrated circuit process technology, the field of digital image and video processing has been experiencing tremendous growth. Advances in high capacity memory chips and VLSI technology have created a new horizon in low cost implementations of complex video compression algorithms making the transmission of video signals with an acceptable quality at very low rates feasible.

Various image compression techniques are well known in the art such as DPCM and transform coding, as described by H. M. Musmann, P. Pirsch and H. J. Gravoert, in "Advances in picture coding," *Proc. IEEE*, vol. 73, pp. 523–548, April 1985. For low bit-rate motion video signals the combination of the two, known as hybrid coding, is considered to be the most efficient compression method. Descriptions of this hybrid coding scheme are described by H. Habibi, in "An adaptive strategy for hybrid image coding," *IEEE Trans. Commun.*, vol. COM-29, pp. 1736–1740, December 1981; by W. Chen and W. K. Pratt, in "Scene adaptive coder," IEEE Trans. Commun., vol. COM-32, pp. 225–232, March 1984; and by S. Okubo, R. Nicol, B. Haskel and S. Sabri, in "Progress of CCITT standardization on n×384 kbits/s video codec," *Globcom*-87.

In an interframe hybrid coder, each block of pel data, each element of which digitally represents the magnitude of a picture element, is element-to-element compared with corresponding elements in a reconstructed coded block from the previous frame. The resultant block of difference data is transformed using a two-dimensional transform algorithm such as a two-dimensional discrete cosine transformation, and the coefficients in each block of data are quantized and entropy coded for transmission over the data channel. At the transmitter, each block and thereby the entire frame is reconstructed by inversely transforming the quantized coefficients and adding them to the corresponding reconstructed pel elements of the previous frame. A frame memory stores the reconstructed pel elements for the next block-by-block differential comparison with the pel elements in the next video frame. Similarly, at the receiver the entropy encoded data stream is decoded and an inverse transformer reconstructs the quantized differential pel elements of each block which are added to the pel elements of the previous frame to form the pel elements of the present frame.

The coding efficiency of an interframe coder can be further improved by using motion compensation prediction methods such as described by T. Koga, K. Iinuma, A. Hirano, Y, Iijima, and T. Ishiyuro in "Motion-compensated interframe coding for video conferencing," in *Proc. NTC* 81, pp. G5.311-G5.3.5. When using such methods, each block of data is characterized at the input of the encoder as a static block or a dynamic block, determined as a function of the magnitude of the difference data between the present block and the corresponding block from the previous frame. If the difference data is greater than a threshold, the block is characterized as dynamic and the previous frame is scanned to locate a the block that most closely matches the present block. Difference data is then formed between the present block and the "matching" block in the previous frame. The transformed coefficients of each block are then transmitted by the encoder together with overhead information that includes a motion vector that indicates the shift in position of the block between frames.

The coding efficiency of a hybrid encoder depends on the coding of the transform coefficients, the effectiveness of the motion compensated prediction, and the size of the transform block. Advantageously, a large block size achieves better compression since less overhead information need be transmitted per video frame of data since fewer blocks are required to be transmitted per frame. Disadvantageously, however, as the block size increases, the complexity of the circuitry required to perform the transformation of each block dramatically increases. Furthermore, as the block size increases, there is increased subjective degradation in the decoded video signal noted by the presence of block distortion in which the viewer perceives the outlines of the blocks.

An object of the present invention is to combine the advantages of both large and small block transformation in a hybrid type coder.

An additional object of the present invention is to entropy encode the coefficients of the transformed block data in as an efficient manner as possible and thereby transmit the video signal at a low bit rate.

SUMMARY OF THE INVENTION

In accordance with the present invention, the two-dimensional blocks of $m \times m$ pel data at the input to the hybrid-type of encoder are subdivided, after subtracting the corresponding block data from the previous frame, into smaller sub-blocks of size $n \times n$ ($n < m$). Transformation within the loop of the hybrid coder is then performed on a sub-block basis. After transformation and quantization, the block is reconstructed and the coefficients of the block transmitted to the receiver on a block by block basis, together with the block overhead data. This overhead data includes block classification (static or dynamic block) and the block matching motion estimation of a dynamic block which are both performed on the main block basis. In order to achieve maximum compression, only nonzero coefficients with their corresponding positional information are transmitted. The nonzero coefficients are variable word-length coded and the positional information is run-length coded. In order to increase the average runs of zero and nonzero coefficients and therefore improve coding efficiency, the quantized transform coefficients are scanned in a way that exploits the inter-sub-block correlation. In particular, for each block of data, corresponding coefficients in each sub-block are grouped together. The order in which the sub-blocks are scanned (inter-subblock scanning) can either be horizontal in which the sub-blocks are scanned from left to right and top to bottom, vertical in which the scanning is performed from top to bottom and left to right, or in a predetermined zig-zag pattern. The inter-sub-block scanning pattern either can be predetermined in advance for all blocks or, alternatively, can be made adaptive by deciding which scanning method is most efficient and transmitting additional overhead information to the receiver at the beginning of each block that indicates the particular inter-sub-block scanning method employed.

BRIEF DESCRIPTION OF THE DRAWING

FIG. 4 is a quantizer masking file for the quantizer in FIG. 3;

FIG. 5 shows a reconstructed 16×16 pel element block comprising 16 sub-blocks;

FIG. 6 shows an intra-sub-block scanning pattern for a 4×4 sub-block;

FIG. 7A shows a zig-zag inter-sub-block scanning pattern for the 16×16 reconstructed block of FIG. 5;

FIG. 7B shows a horizontal inter-sub-block scanning pattern for the reconstructed block of FIG. 5; and FIG. 7C shows a vertical inter-sub-block scanning pattern for the reconstructed block of FIG. 5.

DETAILED DESCRIPTION

Figure 1:
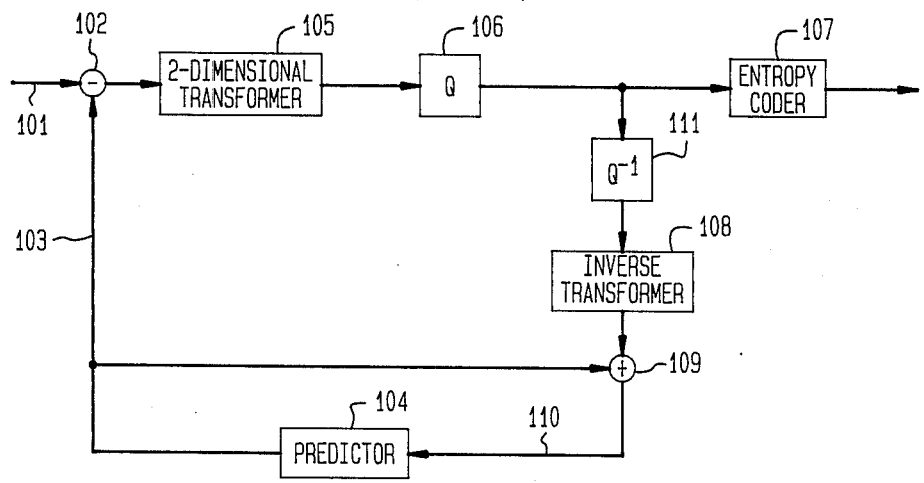
FIG. 1 is a block diagram of a prior art hybrid coder.

With reference to FIG. 1, a prior art hybrid coder is shown in which m×m blocks of pel data from a digitized frame of video information are applied to subtracter 102 via input 101. Subtracted from each block of pel values is a block of predicted pel values on lead(s) 103 derived from the previous video frame as reconstructed within the encoder and stored in predictor 104. The two-dimensional m×m differential data at the output of subtracter 102 is transformed by a two-dimensional signal transformer 105 which uses a signal transformation such as the known in the art two-dimensional discrete cosine transformation. The resultant m×m block of transform coefficients at the output of transformer 105 has too many bits for efficient transmission. In particular, if the input consists of an m×m block of difference data in which each differential pel value within the block comprises 8 bits plus a sign bit, then the transformer requires $9 + \log_2 m \times m$ bit precision in order to have a minimum roundoff error. Thus for an 8×8 block of pel data, 15 bits per coefficient are required. Typically, however, the discrete cosine transformer will produce, for an 8×8 block input block, transform coefficients with 12 bit precision.

In order to improve coding efficiency, the transform coefficients of each transformed block of data are quantized by a quantizer 106. Quantizer 106 may truncate the number of bits per coefficient, may uniformly quantize each coefficient using a a uniform quantizer with a center dead zone d and step size Δ, or may quantize each coefficient with a quantizer that has a center dead done d and nonuniform steps. Such quantizer may be the same for each transform coefficient in the block or may vary from coefficient to coefficient.

Figure 2:
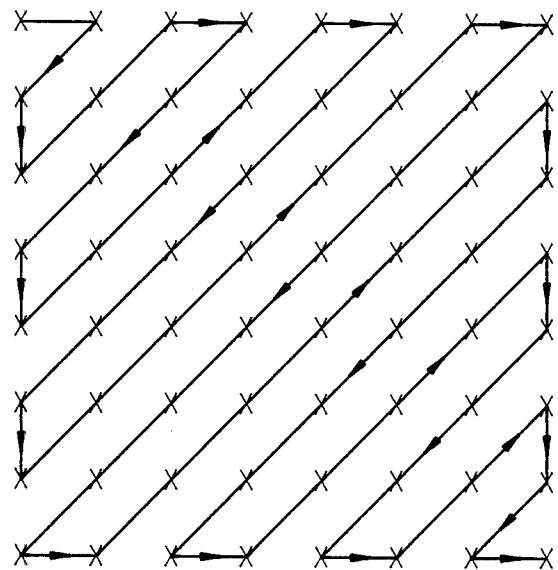
FIG. 2 is a diagram showing the zig-zag scanning pattern used by the the hybrid coder in FIG. 1.

Advantageously, after quantization a significant number of transform coefficients are likely to be zero. Entropy coder 107 scans the two-dimensional block of quantized transform coefficients and and employs variable word length and run-length coding techniques to the scanned block of data. In particular, because of the large number of zero coefficients in the quantized block of transform coefficients, run-length coding is employed to transmit the zero coefficients whereby a flag code followed by the run length of zero coefficients is transmitted. Variable length coding techniques are used to encode each of the non-zero coefficients for transmission. The data stream thus consists of variable wordlength code words for each non-zero coefficient and run-length code words for strings of zero coefficients. In order to maximize runs of zero coefficients, intrablock scanning is performed via means of a zig-zag pattern, illustrated in FIG. 2 for an 8×8 block.

While each block of transformed differential coefficients is transmitted to the receiver by the entropy coder 107, the actual magnitudes of the pel values in the block are reconstructed within the transmitter for differential comparison with the corresponding pel elements in the next video frame. Accordingly, an inverse quantizer 111 remaps the quantized transform coefficients to transform coefficient levels and an inverse transformer 108 transforms these transform coefficients back to differential pel element levels. The differential pel elements are then added by summer 109 to the pel elements of the previous frame as stored in predictor 104. The resultant output of summer 109 on leads 110 is stored by predictor 104 for subsequent differential comparison with the next video frame.

Although not explicitly shown in FIG. 1, various prior art interframe hybrid coders of the type shown in FIG. 1 also include means for classifying each block of pel data as either a static or dynamic block. A static block is a block of pel data that represents image information that has not moved between frames whereas a dynamic block is a block that has shifted position between frames. Various methods for classifying the input blocks are known in the art such as using minimum mean square block difference between corresponding frame-to-frame blocks or the minimum average absolute block difference between corresponding frame-to-frame blocks. If a block is classified as a dynamic block, a vector representing the motion displacement of the block from its corresponding position in the previous frame is transmitted to the receiver as overhead data together with the block classification as a dynamic block. This overhead data is transmitted prior to the the transformed differential block data derived from the difference between the present block and its corresponding displaced block in the previous frame.

At the receiver (not shown in FIG. 1), a decoder decodes the the data stream by determining from the overhead data the classification of each block and any corresponding motion vector if classified as a dynamic block. An inverse quantizer remaps the quantized levels back to transform coefficients for each block and an inverse transformer transforms these coefficients back to the pel domain. The pel values within the block are determined by adding the decoded differential pel elements to the corresponding stored pel elements from the previous frame.

As previously discussed, the larger the block size, the more efficiently (i.e. into the fewest number of bits) each video frame can be encoded. The larger the block size, however, the more complex the implementation of the transformer becomes. In addition, larger block sizes create visually disturbing interblock distortion. The present invention incorporates the advantages of both large and small block size.

Figure 3:
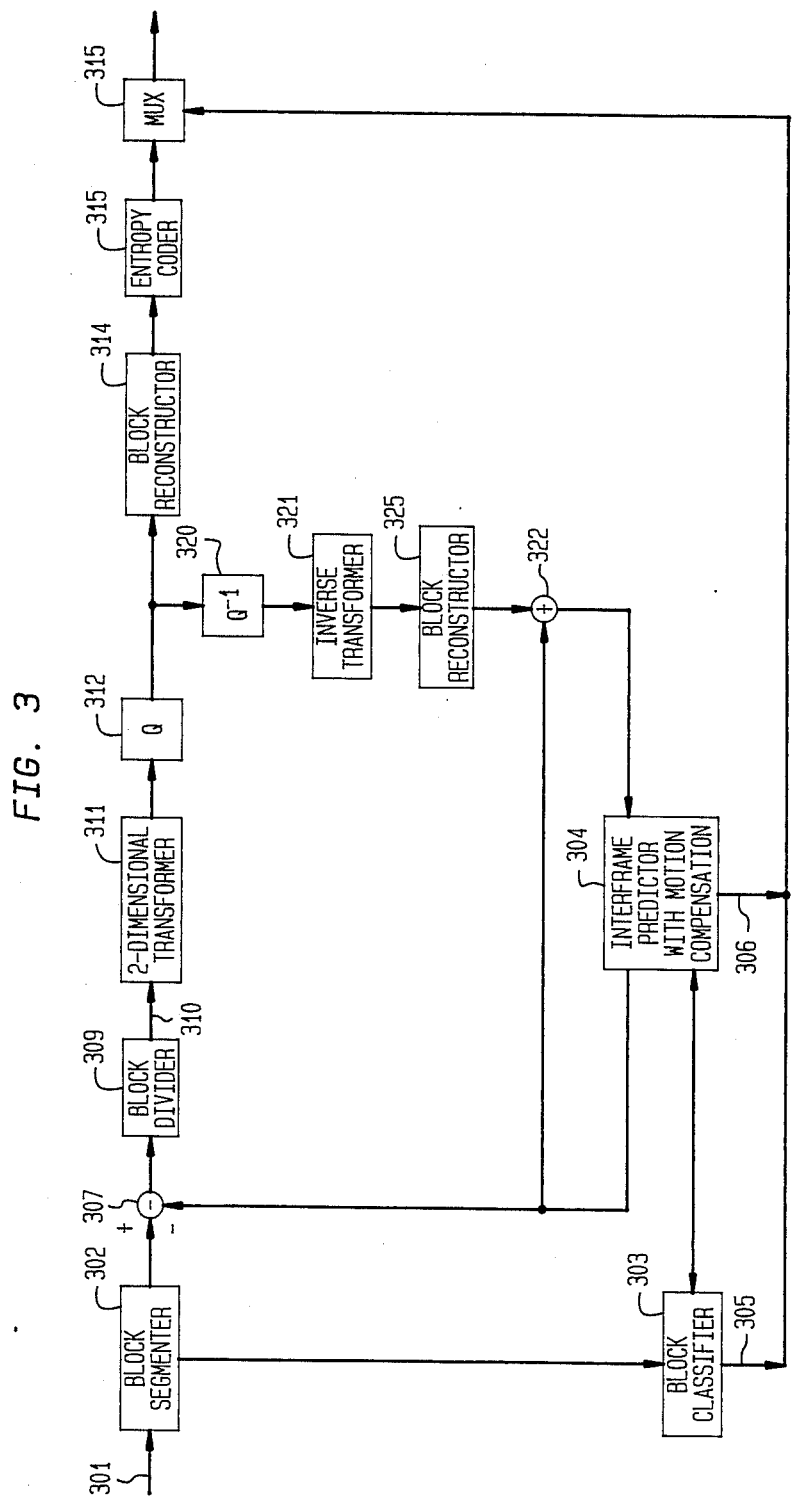
FIG. 3 is a block diagram of a hybrid coder in accordance with the present invention.

With reference to FIG. 3, a block diagram of a video coder in accordance with the present invention is shown. The digital pel information of each pixel of the video signal is sequentially applied via parallel inputs 301 to a block segmenter 302. Block segmenter 302 segments each frame of digital video information into blocks of m×m pels which for purposes of illustration in the present discussion will be 16×16. Accordingly, block segmenter 302 has the storage capacity for 16 lines of pel information. Each 16×16 segmented block of pel data is classified by block classifier 303 as either a static or dynamic block by comparing the pels in the block with the pels in the corresponding block in the previous frame which is stored in the "interframe predictor with motion compensation" 304. Using one of the aforenoted known classification techniques, each block is classified and a unique code generated by classifier 303 on lead(s) 305 which code will be combined as overhead data with the transformed differential block data. In addition, if the block is classified as a dynamic block, comparisons of the current block with the pel data stored in predictor 304 are made until the group of pel elements "closest" to the current block is located and a motion vector is generated by predictor 304 to indicate the position shift of the current block between frames. This motion vector on lead(s) 306 plus the block classification on lead(s) 305 are transmitted as overhead data with the transformed differential quantized block data.

If classified as a static block, the 16×16 block of pel data segmented by block segmenter 302 is differentially combined by digital subtracter 307 with the spatially corresponding block in the previous frame as stored in interframe predictor 304. Alternatively, if classified as a dynamic block, the input block is differentially combined with its spatially corresponding "closest" block in the previous frame and stored in predictor 304. If each pel within the block is digitally represented as an 8-bit code word, each word at the output of subtracter 307 is represented as a 9-bit word, one bit representing the sign of the difference.

In accordance with the present invention, transform processing of the differential block of data is performed within the loop of the encoder on a sub-block basis wherein each m×m block of differential pel data is further divided into sub-blocks of n×n, (n<m). In the particular embodiment of the present invention described herein, each 16×16 block of pel data at the input to subtracter 307 is subdivided into four 4×4 sub-blocks. Accordingly, block divider 309 subdivides each block of differential data at the output of subtracter 307 and provides at its output 310 the 16 9-bit differential pel elements. For ease of processing by the transformer, the outputs of block divider are provided in parallel on 16×9 output leads. A two-dimensional transformer 311, such as a discrete cosine transformer well known in the art, transforms each 4×4 block into a 4×4 block of transform coefficients. As aforenoted, a 9-bit input requires a 15-bit output precision. Generally, however, the coefficients produced by such a transformer will have 12-bit precision. For coding efficiency, each of the 12-bit transform coefficients are then quantized into fewer number of levels by a quantizer 312. Quantizer 312 is a uniform quantizer with a center dead zone d and step size Δ which are independent of each other and different from one coefficient to another. For example, the lower transform coefficients are quantized with a greater accuracy than the higher coefficients. Thus quantizer 312 contains a memory device which has stored therein the 4×4 quantizers for each coefficient in the sub-block. The two-dimensional distribution of the various quantizers for the transform coefficients is performed by a masking file, shown in FIG. 4. The function of the quantized masking file is to assign a set of quantizers to each coefficient. For example $q_{h,l}$ is the quantizer which is assigned to the coefficient in the hth column and the lth row in the sub-block. Each of these quantizers differs in the value of their dead zone d.

After a block is subdivided, and each sub-block transformed and quantized, the block is reconstructed by block reconstructor 314 from the 16 sub-blocks. FIG. 5 illustrates the reconstructed 16×16 block from the 16 individual sub-blocks, where the each coefficient $$c_{pq}^{kl} \ (k, l, p, q = 1 - 4)$$

represents the coefficient in pth column of the qth row in the kth vertical and lth horizontal group of sub-blocks in the reconstructed matrix of sub-blocks.

After quantization, a significant number of coefficients in each sub-block are likely to be zero. In order to maximize bit efficiency it is desirable to exploit the inter-sub-block correlation by scanning the sub-blocks in a manner that zero and non-zero coefficients are grouped together, thereby creating runs of zero and non-zero coefficients. Then, rather than variable wordlength coding the non-zero coefficients and run-length coding the length of the runs of zero coefficients, the scanned block is considered as consecutive black and white runs where the black run corresponds to the length of the zero coefficients and the white run corresponds to the length of the non-zero coefficients. The black and white runs are run-length coded and transmitted, providing address information within the block of the location of non-zero coefficients. Once the last run of non-zero coefficients is transmitted, an end of block code is transmitted. Following the transmission of this address information, the actual non-zero coefficient values are successively variable wordlength coded, the particular coefficient $$c_{pq}^{kl}$$

to which each received non-zero code word is associated being determined from the address information. The majority of the transmitted bits thereby goes towards transmitting the run-length coded positional information.

Figure 7A:
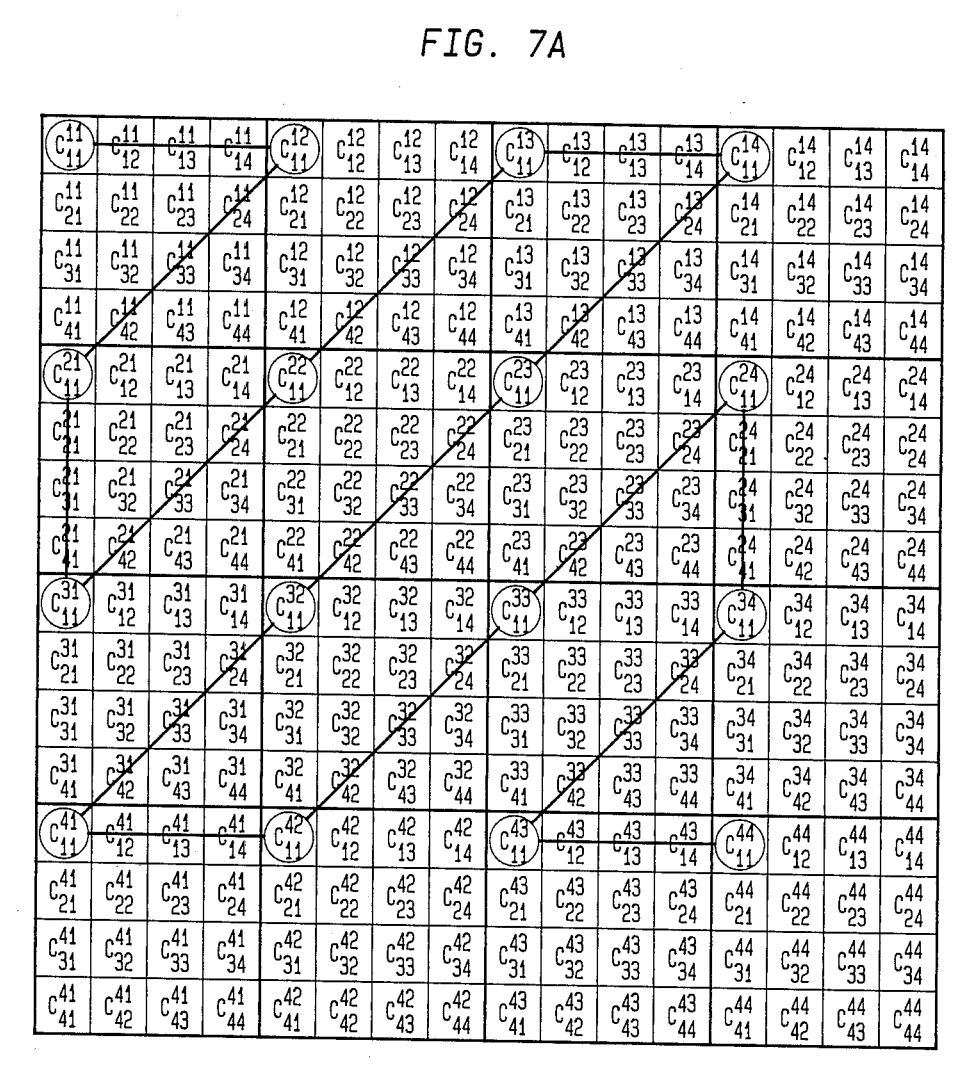

In order to maximize the efficiency in which the positional information is coded, entropy coder 315 scans the reconstructed block to maximize the average black and white runs and thereby reduce the bits required for transmitting the positional information. For each block, the sub-block coefficients are scanned by grouping all the first coefficients, followed by all the second coefficients and so on. The order within each sub-block that the coefficients are scanned is known as intra-sub-block scanning whereas the order in which for a particular coefficient the sub-blocks are scanned is inter-sub-block scanning. FIG. 6 shows the intra-sub-block scanning order employed for a 4×4 sub-block. As noted, the within the sub-blocks, the coefficients are scanned by a zig-zag pattern. Scanning between sub-blocks however can the performed by one of three scanning patterns. FIG. 7A shows the first, in which the sub-blocks are scanned in a zig-zag pattern. Thus, using this scanning pattern, the scanning order for the first coefficient is $$c_{11}^{11}c_{11}^{12}c_{11}^{21}c_{11}^{31}c_{11}^{22}c_{11}^{13}c_{11}^{14}c_{11}^{23}c_{11}^{32}c_{11}^{41}c_{11}^{42}c_{11}^{33}c_{11}^{24}c_{11}^{34}c_{11}^{43}c_{11}^{44}.$$

FIG. 7B shows the second scanning pattern in which the sub-blocks are scanned horizontally from left to right and from top to bottom. Using this scanning pattern, the scanning order for the first coefficient is $$c_{11}^{11}c_{11}^{12}c_{11}^{13}c_{11}^{14}c_{11}^{21}c_{11}^{22}c_{11}^{23}c_{11}^{24}c_{11}^{31}c_{11}^{32}c_{11}^{33}c_{11}^{34}c_{11}^{41}c_{11}^{42}c_{11}^{43}c_{11}^{44}.$$

Figure 7C:
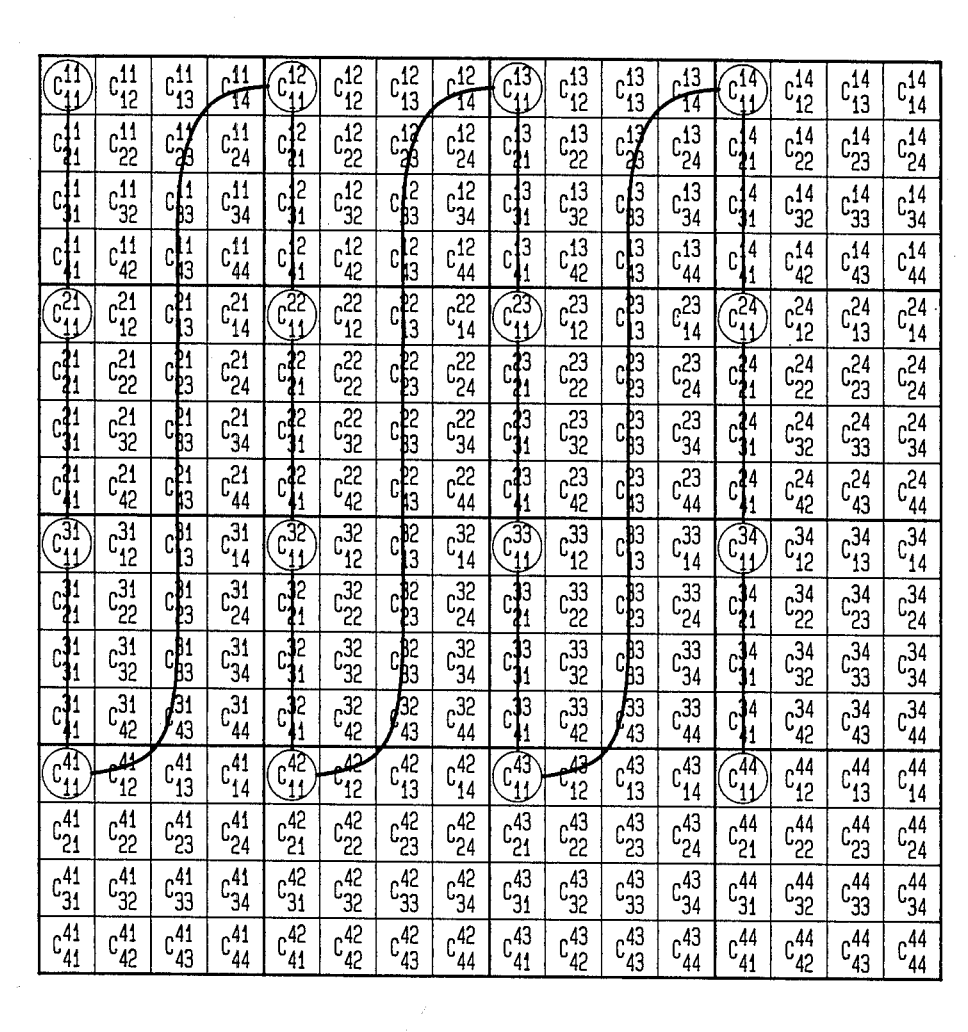

A third scanning pattern is illustrated in FIG. 7C in which the sub-blocks are scanned vertically from top to bottom and left to right. Using this scanning patter the scanning order for the first coefficient is $$c_{11}^{11}c_{11}^{21}c_{11}^{31}c_{11}^{41}c_{11}^{12}c_{11}^{22}c_{11}^{32}c_{11}^{42}c_{11}^{13}c_{11}^{23}c_{11}^{33}c_{11}^{43}c_{11}^{14}c_{11}^{24}c_{11}^{34}c_{11}^{44}.$$

In all cases, the intra-sub-block ordering of the coefficients would per FIG. 6 as $$c_{11}^{all}c_{12}^{all}c_{21}^{all}c_{31}^{all}c_{22}^{all}c_{13}^{all}c_{14}^{all}c_{23}^{all}c_{32}^{all}c_{41}^{all}c_{42}^{all}c_{33}^{all}c_{23}^{all}c_{34}^{all}c_{43}^{all}c_{44}^{all}.$$

After entropy coder 315 scans the reconstructed block by one of the afore-described inter-sub-block scanning methods the black and white runs in the bit stream are run-length coded and the non-zero coefficients are variable word-length coded in the manner described above. The resultant bit stream is combined by multiplexer 316 with the overhead information information for the block (block classification plus motion vector) generated by block classifier 305 and predictor 304.

Efficiency can be further improved by adaptively scanning the reconstructed block. With adaptive scanning, coder 315 scans and codes the reconstructed block by each of the methods shown in FIGS. 7A, 7B, and 7C and transmits to the receiver the bit stream that is most efficient for that particular block of data with an overhead code at the beginning of the block that indicates the particular scanning pattern employed.

At the receiver (not shown), an entropy decoder demultiplexes the overhead data of each block and decodes the block data in accordance with the indicated scanning pattern. The reconstructed block is reformed and an inverse quantizer remaps the quantized coefficient in each of the sub-blocks within the reconstructed block back to a value on the coefficient value scale. Each sub-block is inversely transformed to produce differential pel values which are added, if the overhead data indicates a static block, to the spatially corresponding pel values of the previous frame, as stored in the receiver. If the overhead data associated with the block indicates that the block is dynamic, the decoded differential pel values are added to a block in the previous frame which is located by means of the motion vector transmitted with the overhead data.

With reference again to FIG. 3, the coder reconstructs the pel values of the present block from the quantized transformed coefficients for differential comparison with the next frame. Accordingly, an inverse quantizer 320 remaps the quantized transform coefficients at the output of quantizer 312 for each sub-block into actual quantized transform coefficient levels. Inverse transformer 321 transforms these quantized coefficients back to the pel domain using a transformation inverse to that employed by transformer 311. Block reconstructor 325 reconstructs a block of differential pel elements from the set of inversely transformed sub-blocks. These differential pel elements in the reconstructed block are added by digital adder 322 to the spatially corresponding pel values from the previous frame as stored in predictor 304. The resultant sum, representing the reconstructed pel values of the present frame are stored by predictor 304 for subsequent comparison by subtracter 307 with corresponding input pel values in the next frame.

In summary, by performing block classification and motion estimation on a block basis, the amount of overhead information is reduced. On the other hand by performing transformation on a sub-block basis, hardware complexity and block distortion are reduced. Accordingly, the advantages of both the large and small block sizes for hybrid coding video signals are obtained without the inherent disadvantages of either.

Although the above-described embodiment employs a two-dimensional signal transformation on each sub-block, such as the discrete cosine transformation, other forms of signal processing can be incorporated to operate on a sub-block basis on the differential pel data. For example, vector quantization, well known in the art, can be applied in place of signal transformation, with almost the same advantages.

The above-described embodiment is illustrative of the principles of the present invention. Other embodiments could be devised by those skilled in the art without departing from the spirit and scope of the present invention.

What is claimed is:

1. In an interframe video hybrid coder which comprises means for transforming blocks of differential video pel data into blocks of transform coefficients, means for quantizing the transform coefficients of each transformed block, and means for entropy coding the quantized transform coefficients of each transform block, apparatus comprising:

means for subdividing each block of differential pel data into smaller sub-blocks, said transforming means transforming each sub-block of each block and said quantizing means quantizing the transform coefficients of each transformed sub-block; and means for reconstructing a block of quantized transform coefficients from the quantized transformed sub-blocks.

2. An interframe video coder for coding an input block of pel data from a video frame comprising:

means for differentially combining the pel elements of the input block with corresponding pel elements in a previous frame;

means for subdividing the input block of pel elements into plural smaller sub-blocks of pel elements;

means using a two-dimensional signal transformation for transforming each sub-block of pel elements into a sub-block of transform coefficients;

means for quantizing the coefficients in each sub-block of transform coefficients;

means for combining into one block, the sub-blocks of transform coefficients associated with the input block; and means for entropy coding the quantized transform coefficients for transmission in a data stream, said entropy coding means scanning the sub-blocks of quantized transform coefficients to group positionally corresponding coefficients together.

3. The coder in accordance with claim 2 wherein said quantizing means comprises means for quantizing each coefficient within the sub-block of transform coefficients by means of an individually determined quantizing algorithm.

4. The coder in accordance with claim 2 further comprising:
   means for classifying the input block of pel data as a static block or a dynamic block;
   means for deriving a motion vector indicating the shift of the input block between frames if classified as a dynamic block;
   means for generating overhead data representing the block classification and, if classified as a dynamic block, the motion vector; and
   means for combining said overhead data with the data stream generated from said block of quantized transform coefficients by said entropy coding means.

5. The coder in accordance with claim 4 wherein said entropy coding means in grouping positionally corresponding coefficients together scans the sub-blocks of quantized transform coefficients in a predetermined pattern.

6. The coder in accordance with claim 5 wherein the order of scanning sub-blocks within the combined block is a predetermined zig-zag pattern.

7. The coder in accordance with claim 5 wherein the sub-blocks within the combined block of quantized transform coefficients are scanned horizontally, left-to-right, top-to-bottom.

8. The coder in accordance with claim 5 wherein the sub-blocks within the combined block of quantized transform coefficients are scanned vertically, top-to-bottom, left-to-right.

9. The coder in accordance with claim 5 wherein the sub-blocks within the combined block of quantized transform coefficients are scanned in a plurality of predetermined patterns, and said entropy coder transmits a bit stream using the most bit efficient scanning pattern together with an overhead word indicating the particular scanning pattern selected.

10. The coder in accordance with claim 5 where the data stream generated by said entropy coder comprises run-length coded positional information indicating runs of zero and non-zero quantized transform coefficients followed by variable wordlength code word representations of the non-zero coefficients.

11. A method for coding video pel data comprising the steps of:
    dividing each video frame into blocks of pel data;
    differentially combining each block of pel data with a corresponding block in a previous frame;
    subdividing each block of differential pel data into smaller sub-blocks;
    transforming, using a two-dimensional signal transformation, each sub-block of pel data into a corresponding sub-block of transform coefficients;
    quantizing the coefficients in each sub-block of transform coefficients;
    combining the sub-blocks of transform coefficients into a block of transform coefficients; and
    entropy encoding the block of transform coefficients by scanning the sub-blocks with the block by grouping positionally corresponding coefficients together.

12. The method in accordance with claim 11 further comprising the steps of:
    encoding runs of zero and non-zero coefficients with run-length coded words indicating the length of the run; and
    variable wordlength encoding each non-zero coefficient.

13. A coder for coding an input block of pel data from a video frame comprising:
    means for differentially combining the pel elements of the input block with corresponding pel elements in a previous frame;
    means for subdividing the input block of pel elements into plural sub-blocks of pel elements;
    means for signal processing the sub-blocks by a predetermined processing algorithm to produce sub-blocks of data related to the differential pel elements;
    means for combining into one block, the sub-blocks of processed data; and
    means for entropy coding the data in said combined block for transmission in a data stream.

14. The coder in accordance with claim 13 further comprising:
    means for classifying the input block of pel data as a static block or a dynamic block;
    means for deriving a motion vector indicating the shift of the input block between frames if classified as a dynamic block;
    means for generating overhead data representing the block classification and, if classified as a dynamic block, the motion vector; and
    means for combining said overhead data with the data stream generated from said combined block by said entroy coding means.

15. The coder in accordance with claim 13 wherein said predetermined processing algorithm is vector quantization.

16. The coder in accordance with claim 13 wherein said predetermined processing algorithm is two-dimensional signal transformation.

17. The coder in accordance with claim 16 wherein the two-dimensional signal transformation is the discrete cosine transformation.

* * * * *

UNITED STATES PATENT AND TRADEMARK OFFICE
CERTIFICATE OF CORRECTION

PATENT NO. : 4,821,119

DATED : April 11, 1989

INVENTOR(S) : Hamid Gharavi

It is certified that error appears in the above-identified patent and that said Letters Patent is hereby corrected as shown below:

Column 6, line 19, change "ki" to --kl--.
Column 6, line 46, change "ki" to --kl--.

Signed and Sealed this

Twenty-seventh Day of November, 1990

*Attest:*

HARRY F. MANBECK, JR.

*Attesting Officer*   *Commissioner of Patents and Trademarks*